(12) United States Patent
Schulz et al.

(10) Patent No.: US 9,722,518 B2
(45) Date of Patent: Aug. 1, 2017

(54) SYSTEM AND METHOD FOR IMPROVING ACCELERATION PERFORMANCE OF AN ELECTRIC VEHICLE

(71) Applicant: Faraday & Future Inc., Gardena, CA (US)

(72) Inventors: Steven E. Schulz, Torrance, CA (US); Silva Hiti, Redondo Beach, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 14/979,237

(22) Filed: Dec. 22, 2015

(65) Prior Publication Data

US 2017/0179861 A1 Jun. 22, 2017

(51) Int. Cl.
*H02P 27/04* (2016.01)
*H02P 6/28* (2016.01)
*H02P 27/06* (2006.01)

(52) U.S. Cl.
CPC ............... *H02P 6/28* (2016.02); *H02P 27/06* (2013.01)

(58) Field of Classification Search
CPC .. B60L 15/20; B60L 15/2045; B60L 2210/40; B60L 2240/423; B60L 2240/441; B60L 2240/443; B60L 2240/526; B60L 2270/142; B60L 11/18; Y02T 10/645; Y02T 10/7241; Y02T 10/7283;
(Continued)

(56) References Cited

U.S. PATENT DOCUMENTS

| 5,486,748 A | 1/1996 | Konrad et al. |
| 5,880,574 A | 3/1999 | Otsuka et al. |

(Continued)

FOREIGN PATENT DOCUMENTS

| JP | 05184182 A | 7/1993 |
| JP | 09121595 A | 5/1997 |

(Continued)

OTHER PUBLICATIONS

J. Zhang, High Performance Control of a Three-Level IGBT Inverter Fed AC Drive, IEEE 1995, 7 pages.
(Continued)

*Primary Examiner* — Antony M Paul
(74) *Attorney, Agent, or Firm* — Finnegan, Henderson, Farabow, Garrett & Dunner, LLP

(57) ABSTRACT

Systems and methods are disclosed for improving acceleration performance of an electric vehicle that includes an electric motor for propulsion. An exemplary system may include an inverter configured to drive the electric motor. The inverter may include at least one power electronic device. The system may also include a torque capability controller. The torque capability controller may be configured to receive information indicative of a selection between a first mode and a second mode. The second mode may correspond to a higher torque to be output by the electric motor than the first mode. The torque capability controller may also be configured to apply a switching frequency to the at least one power electronic device. The switching frequency may have a lower value when the received information indicates the selection of the second mode than when the received information indicates the selection of the first mode.

20 Claims, 6 Drawing Sheets

(58) Field of Classification Search
CPC .. H02P 27/04; H02P 7/29; H02P 27/08; H02P 27/06; H02P 6/00; H02P 7/00; G05B 11/28
USPC .... 318/400.01, 400.02, 400.14, 400.15, 700, 318/701, 721, 727, 799, 800, 801, 430, 318/432, 437, 139, 805, 807; 363/40, 44, 363/95, 120, 174, 175; 180/65.23, 65.285
See application file for complete search history.

(56) References Cited

U.S. PATENT DOCUMENTS

| | | | |
|---|---|---|---|
| 8,278,855 B2* | 10/2012 | Kitanaka | H02P 27/08 318/400.22 |
| 2007/0001636 A1 | 1/2007 | Murphree | |
| 2009/0108780 A1 | 4/2009 | Schulz et al. | |
| 2010/0007300 A1 | 1/2010 | Hein et al. | |
| 2014/0306628 A1 | 10/2014 | Benson et al. | |

FOREIGN PATENT DOCUMENTS

| | | |
|---|---|---|
| JP | 3812299 B2 | 8/2006 |
| WO | WO 2012-069053 A2 | 5/2012 |

OTHER PUBLICATIONS

M. A. M. Prats, et al., A Switching Control Strategy Based on Output Regulation Subspaces for the Control of Induction Motors Using a Three-Level Inverter, IEEE Power Electronics Letters, vol. 1, No. 2, Jun. 2003, 4 pages.

K. Okubo et al., Development of Low-Loss Inverters for Electric Vehicle (EV) Motors, Mitsubishi Heavy Industries, Ltd. Technical Review, vol. 45, No. 3, Sep. 2008, 3 pages.

International Search Report Notification and Written Opinion issued in corresponding International Application No. PCT/US2016/065124, mailed Mar. 17, 2017 (11 pp.).

\* cited by examiner

SYSTEM AND METHOD FOR IMPROVING ACCELERATION PERFORMANCE OF AN ELECTRIC VEHICLE

TECHNICAL FIELD

This disclosure relates generally to electric vehicles, and more particularly, to systems and methods for increasing torque output of an electric motor in an electric vehicle by controlling an input current to the electric motor and a switching frequency used by a motor control system of the electric motor.

BACKGROUND

Acceleration is an important performance factor for a vehicle, such as a sports car. Car manufacturers have been investing substantial resources in an effort to improve the acceleration performance.

Traditionally, most high-performance vehicles are gasoline powered. To improve the acceleration performance of a gasoline car, car manufacturers normally use a powerful internal combustion engine having a high horsepower rating in order to generate a high torque during initial acceleration.

With the development of battery technology and high-performance motor systems, electric vehicles have become increasingly popular as a viable alternative to the traditional gasoline vehicles. In electric vehicles, the acceleration performance relates to the performance of the electric motor system that provides propulsion.

Current research and development efforts on improving the acceleration performance of electric vehicles focus on increasing the output power of the electric motors and the batteries. This approach is similar to the one followed by the R&D community of the gasoline cars, in that an electric motor is often seen as a counterpart of an internal combustion engine and a battery is often seen as a counterpart of a fuel system. The specific properties of the electric motor control system and their relationship with the torque output ability of the motor, however, have not been adequately explored. The present disclosure is directed to improving the motor control system of an electric vehicle to provide additional torque output, thereby further improving the acceleration performance of the electric vehicle.

SUMMARY

In one aspect, the present disclosure is directed to a system for controlling an electric motor. The system may include an inverter configured to drive the electric motor. The inverter may include at least one power electronic device. The system may also include a torque capability controller. The torque capability controller may be configured to receive information indicative of a selection between a first mode and a second mode. The second mode may correspond to a higher torque to be output by the electric motor than the first mode. The torque capability controller may also be configured to apply a switching frequency to the at least one power electronic device. The switching frequency may have a lower value when the received information indicates the selection of the second mode than when the received information indicates the selection of the first mode.

In another aspect, the present disclosure is directed to a method for controlling an electric motor. The method may include driving the electric motor using an inverter. The inverter may include at least one power electronic device. The method may also include receiving information indicative of a selection between a first mode and a second mode. The second mode may correspond to a higher torque to be output by the electric motor than the first mode. The method may also include applying a switching frequency to the at least one power electronic device. The switching frequency may have a lower value when the received information indicates the selection of the second mode than when the received information indicates the selection of the first mode.

In a further aspect, the present disclosure is directed to a method for controlling an electric motor. The method may include driving the electric motor using an inverter. The inverter may include at least one power electronic device operating according to a switching frequency. The method may also include receiving information indicative of a selection between a first mode and a second mode. The first mode may correspond to a first performance value of the electric motor and the second mode may correspond to a second performance value of the electric motor. The method may further include adjusting the switching frequency applied to the at least one power electronic device according to the received information. The switching frequency may have a first frequency value when the received information indicates the selection of the first mode and a second frequency value when the received information indicates the selection of the second mode.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the claims.

DETAILED DESCRIPTION

Figure 1:
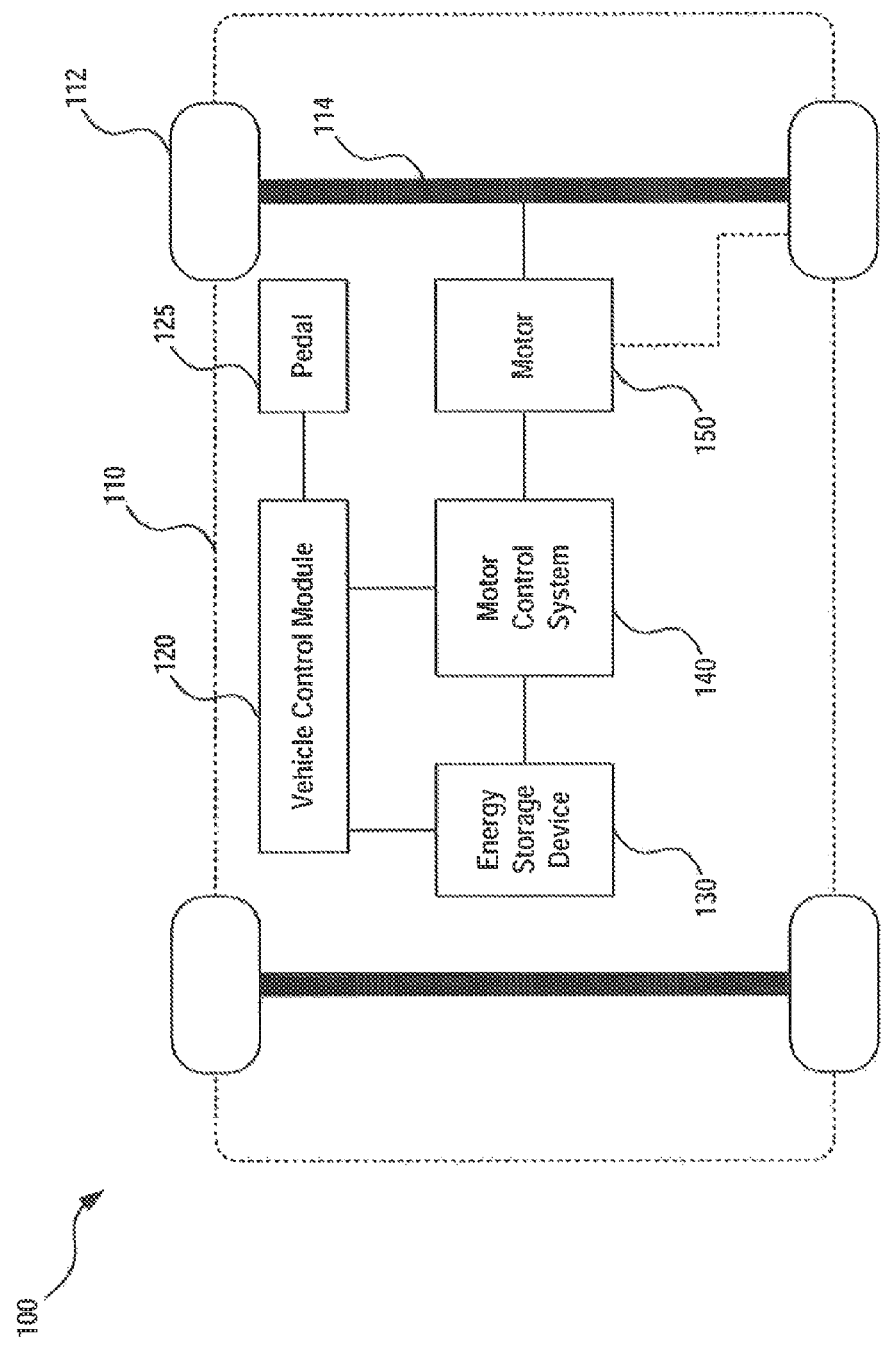
FIG. 1 shows a block diagram of an exemplary embodiment of a vehicle equipped with an electric motor propulsion system.

FIG. 1 shows a block diagram of an exemplary embodiment of a vehicle 100, according to one aspect of the disclosure. Vehicle 100 may have any body style, such as a sports car, a coupe, a sedan, a pick-up truck, a station wagon, a sports utility vehicle (SUV), a minivan, or a conversion van. Vehicle 100 may be an electric vehicle, a hybrid vehicle, or any other vehicle that is completely or partially powered by electricity.

As shown in FIG. 1, vehicle 100 may include a chassis 110 and a plurality of wheels 112. Chassis 110 may be mechanically coupled to wheels 112 by, for example, a suspension system. Vehicle 100 may also include an electric motor propulsion system. For example, vehicle 100 may include one or more electric motors, such as motor 150, to supply motive torque. Wheels 112 may be coupled to motor 150 in various ways. In one embodiment, as illustrated in FIG. 1, opposite wheels may be connected through a shaft 114, which may be mechanically coupled to motor 150 to transmit torque and rotation from motor 150 to the connecting wheels. In another embodiment, motor 150 may drive individual wheels directly, as illustrated, in a simplified manner, by a dashed line from motor 150 to the lower right wheel. For example, motor 150 may be located close to a wheel to provide driving power directly to the wheel. In this case, multiple motors may be used and each wheel may be driven by a separate motor or a group of motors. In another example, motor 150 may be built into a wheel such that the wheel may rotate co-axially with a rotor of the motor.

Motor 150 may be an AC synchronous electric motor including a rotor and a stator (not shown). The stator may include a plurality of poles, with each pole including windings connected to an AC power source, such as a three-phase AC power source. During operation, the AC powered stator may generate a rotating magnetic field to drive the rotor to rotate. The rotor may include windings and/or permanent magnet(s) to form a magnet such that the north/south pole of the magnet is continuously attracted by the south/north pole of the rotating magnetic field generated by the stator, thereby rotating synchronously with the rotating magnetic field. Exemplary AC synchronous electrical motors include interior permanent magnet (IPM) motors and reluctance motors. In some embodiments, the control system and method disclosed herein may also be used to control other types of motors.

Motor 150 may be controlled by a motor control system 140. Motor control system 140 may regulate energy transfer from an energy storage device 130 to motor 150 to drive motor 150. In some embodiments, motor 150 may operate in a generator mode, such as when vehicle 100 undergoes speed reduction or braking actions. In the generator mode, the excess motion energy may be used to drive motor 150 to generate electrical energy and feed the energy back to energy storage device 130 through motor control system 140. In some embodiments, energy storage device 130 may include one or more batteries to supply DC power. Motor control system 140 may include a DC-AC inverter to convert the DC power supplied by energy storage device 130 into AC driving power to drive motor 150. For example, the DC-AC inverter may include power electronic devices operating under a pulse-width modulation (PWM) scheme to convert the DC power into AC power.

Vehicle 100 may include a vehicle control module (also referred to as a vehicle controller) 120 to provide overall control of vehicle 100. For example, vehicle control module 120 may act as an interface between user operation and propulsion system reaction. For example, when a driver depresses an acceleration pedal 125 of vehicle 100, vehicle control module 120 may translate the acceleration operation into a torque value to be output by motor 150, a target rotation speed of motor 150, and/or other similar parameters to be executed by the propulsion system. Vehicle control module 120 may be communicatively connected to motor control system 140 to supply commands and/or receive feedback. Vehicle control module 120 may also be communicatively connected to energy storage device to monitor operation status such as energy level, temperature, recharge count, etc.

Figure 2:
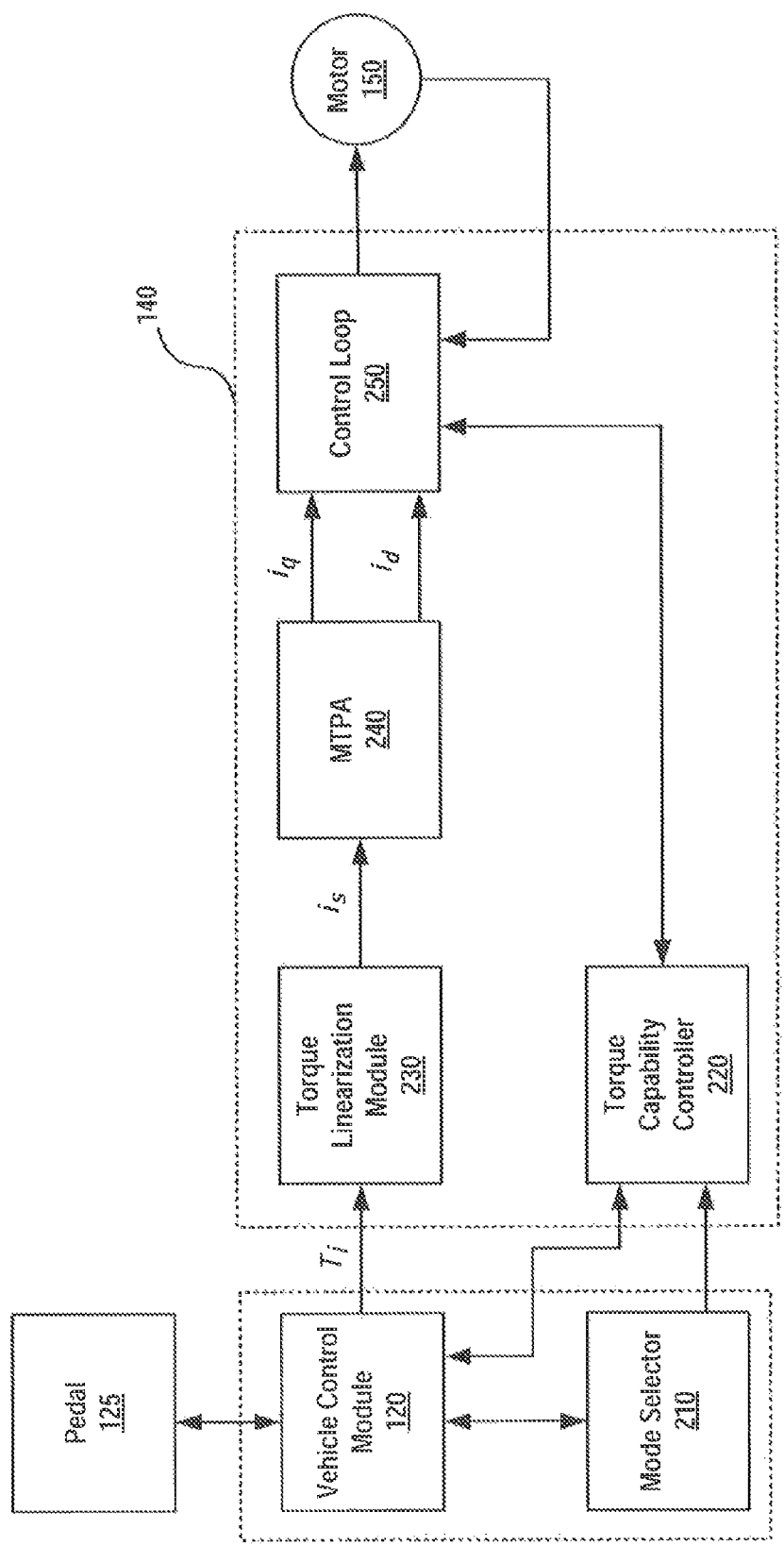
FIG. 2 shows a block diagram of an exemplary embodiment of a motor control system.

FIG. 2 shows a block diagram of an exemplary embodiment of the motor control system 140. Motor control system 140 may receive a torque command generated by vehicle control module 120 corresponding to an acceleration pedal depression action, and control motor 150 to output the required torque according to the torque command. For example, during an initial acceleration process (e.g., vehicle 100 starts up from zero speed), a user (e.g., a driver) of vehicle 100 may depress acceleration pedal 125. In some cases, the user may gradually or gently depress pedal 125 to achieve a smooth and slow acceleration. In other cases, the user may depress pedal 125 hard and abruptly (e.g., floor the pedal) to initiate a sudden and quick acceleration. In any case, the acceleration pedal depression action may be captured or received by vehicle control module 120, which may generate a torque command $T_i$ based on the acceleration pedal depression action. Torque command $T_i$ may indicate the required torque to be output by motor 150 to achieve the acceleration result corresponding to the acceleration pedal depression action.

Vehicle control module 120 may include, or in communication with, a mode selector 210. Mode selector 210 may also be referred to as an acceleration mode selector, a driving mode selector, or the like. Model selector 210 may be configured to provide different driving modes, including at least a normal or base mode and an enhanced mode. In some embodiments, a driving mode may indicate a particular acceleration pattern or acceleration capability. For example, in the normal mode, vehicle 100 may have the highest acceleration (e.g., indicated by an acceleration or performance value $A_{1max}$) when, e.g., the user floors the pedal 125. In the enhanced mode, vehicle 100 may achieve a higher acceleration (e.g., indicated by an enhanced acceleration or performance value $A_{2max}$) in response to the same acceleration pedal depression action as in the normal mode (e.g., when the user floors the pedal 125). As used herein, the term acceleration or performance value refers to an indicator of the acceleration performance of vehicle 100. Exemplary acceleration or performance values may include the change rate of velocity (i.e., the actual acceleration), the time duration for vehicle 100 to accelerate from zero to 60 mph or another predetermined ending speed (note that in this case, a shorter time duration indicates a higher acceleration or performance), the time duration for vehicle 100 to travel a predetermine distance (similar to the time from 0 to 60 mph, a shorter time duration indicates a higher acceleration or performance), etc. The enhanced mode may also be referred to as, for example, a sports mode, a turbo mode, an exhilarating mode, a thrilling mode, a rocket mode, etc. In some embodiments, two or more enhanced modes having different levels of the acceleration performance improvement may be provided.

In some embodiments, mode selector 210 may be part of vehicle control module 120 (as indicated by the dashed block enclosing vehicle control module 120 and mode selector 210 in FIG. 2). For example, mode selector 210 may include hardware, middleware, firmware, and/or software component(s) that are integrated into vehicle control module 120. In some embodiments, mode selector 210 may include one or more separate hardware components or devices communicatively connected to vehicle control module 120. In some embodiments, certain part(s) of mode selector 210 may be integrated into vehicle control module 120, and other part(s) of mode selector 210 may be separately provided and communicatively connected to vehicle control module 120.

In some embodiments, model selector 210 may include a user interface (not shown) to allow the user to select a mode.

The user interface may include an input device such as one or more hardware buttons, switches, levers, knobs, touch/pressure sensitive surfaces, or other suitable hardware devices. The input device may also include one or more touch screens for receiving information from the user. The user may select a mode using the input device of the user interface. The user interface may also include an output device such as one or more display screens, indicator lights, speakers, vibration devices, etc. The output device may display information about available modes to the user. The output device may also provide feedback in response to the user's mode selection. For example, the feedback may include turning on/off one or more indicator lights, changing contents on a display, providing audible feedback, providing vibration feedback, or other types of feedback. In some embodiments, when the user selects a mode, the operation behavior of pedal 125 may also be changed. For example, when the user selects an enhanced mode, vehicle control module 120 may control the resistance of pedal 125 to change the stiffness of pedal 125 (e.g., as felt by the user during a depressing action). Depending on user preference, pedal 125 may either be changed to a stiffer or softer feeling in an enhanced mode.

In some embodiments, mode selector 210 may be provided as an add-on component or an upgradeable component. For example, mode selector 210 may be implemented, at least in part, by software instructions such that the mode selection function may be added to vehicle 100 as a software upgrade. The upgrade may be performed at designated facilities, or may be performed remotely through over-the-air signal transmission. The user may also, for instance, receive the software upgrade data using a mobile device and perform the upgrade by connecting the mobile device with vehicle 100 through a wired or wireless connection channel. In another example, mode selector 210 may require certain hardware addition(s), which may be provided at designated facilities or through a user purchasable hardware kit. In some embodiments, mode selector 210 may involve both hardware and software upgrades.

Referring to FIG. 2, vehicle control module 120 may generate a torque command $T_i$ based on the user's acceleration pedal depression action and the selected mode. For example, vehicle control module may include one or more reference tables, curves, and/or equations for a processing device to determine the torque command based on factors such as the degree of pedal depression, the force/pressure associated with the depression, the time duration of the depression, the speed of the depression, etc. When the depression is slow and gradual, the resulting torque command may indicate a relatively small torque value. On the other hand, when the depression is quick, hard, and/or abrupt, the resulting torque command may indicate a relatively large torque value. The mode information provided by mode selector 210 and/or information about torque capability provided by a torque capability controller 220 (to be described in greater detail below) may change or determine the torque command. For example, assume that in the normal mode, vehicle control module 120 generate a torque command $T_{i1}$ based on a particular acceleration pedal depression action. In the enhanced mode, vehicle control module 120 may generate a modified torque command $T_{i2}$ based on the same acceleration pedal depression action. The modified torque command $T_{i2}$ may indicate a larger torque value than $T_{i1}$, according to the torque capability information provided by torque capability controller 220. When the acceleration pedal depression action is of a type requiring maximum torque output (e.g., floor the pedal action), the modified torque command may indicate an increase of the maximum torque output that may not be achievable in the normal mode. In other words, the capability of torque output can be increased in an enhanced mode.

Embodiments of the present application disclose motor control systems and methods that enable the increase of the maximum torque output or the capability of torque output. An exemplary implementation of motor control system 140, as shown in FIG. 2, may include a torque capability controller 220, a torque linearization module 230 (also referred to as a torque-current convertor), a Maximum Torque Per Ampere (MTPA) module 240, and a control loop 250. Torque linearization module 230 may process torque command $T_i$ received from vehicle control module 120 and generate a corresponding stator current $i_s$ required to develop the desired torque in motor 150. MTPA module 240 may receive the stator current $i_s$ and decompose the stator current $i_s$ into respective d axis and q axis components ($i_d$ and $i_q$). For example, MTPA module 240 may include a look-up table storing mapping relations between values of $i_s$ and values of $i_d$ and $i_q$. The d-q axis current components may be input to control loop 250 to control motor 150. Control loop 250 may include a current regulator (not shown) to generate d-q axis voltage signals based on the d-q axis current components. Control loop 250 may also include a two-phase to three-phase transformer (not shown) to convert the d-q axis voltage signals to three-phase voltage signals. Control loop 250 may also include a pulse width modulation (PWM) inverter (not shown) to convert a DC voltage provided by energy storage device 130 into phase voltages to drive motor 150 based on the three-phase voltage signals. For example, the PWM inverter may switch on and off according to a switching frequency to chop the DC voltage into segments to construct the phase voltages. In some embodiments, control loop 250 may receive feedback from motor 150 such as rotor speed, rotor position, stator currents, etc. The feedback information may be used to form a closed loop to control motor 150.

During initial acceleration, several factors may account for the maximum torque output or torque output capability of motor 150. One factor relates to the heat generated by the PWM inverter of control loop 250. For example, the PWM inverter may include power electronic devices such as insulated-gate bipolar transistors (IGBTs). The power electronic devices may be switched on and off during operation and may generate heat due to electromagnetic (EM) energy loss. The EM energy loss may include two types. The first type may be referred to as conduction loss, indicating the Joule heating experienced by the power electronic devices when they are switched on and conducting current. The conduction loss is a function of the current. A higher current results in a higher conduction loss and vice versa. The second type may be referred to as switching loss, indicating the energy loss during a transient period of switching on/off. The switching loss is a function of the current, the DC voltage, and the switching frequency. A higher current, a higher DC voltage, or a higher switching frequency results in a higher switching loss and vice versa.

As discussed above, to generate a higher torque generally requires a higher current. However, a higher current also results in higher loss (e.g., both the conduction loss and the switching loss become higher as the current increases). Higher loss in turn results in higher heat. The heat should be controlled below a certain threshold to prevent damages to the power electronic devices. Therefore, the heat threshold may limit the total loss, which limits the maximum current and in turn the maximum torque. Generally, conduction loss and switching loss each accounts for about half of the total loss. Therefore, while the total loss is limited by the heat threshold, a higher current may be obtained by changing the relative proportions of the conduction loss and the switching loss.

In some embodiments, the switching frequency may be adjusted during the initial acceleration period to reduce the switching loss. For example, the switching frequency may be reduced to reduce the switching loss. The current may be increased such that the increased conduction loss plus the reduced switching loss remains within the limit of the total loss. The increased current may provide additional torque output to improve the acceleration performance of vehicle 100.

The switching frequency of the PWM inverter may be controlled by torque capability controller 220. Torque capability controller 220 may receive mode selection information from mode selector 210 or vehicle control module 120, and may reduce the switching frequency during initial acceleration period when the enhanced mode is selected. In some embodiments, torque capability controller 220 may determine the value of the switching frequency based on, for example, the selected mode, the operating condition of motor 150 and/or motor control system 140, etc. Torque capability controller 220 may also determine a torque capability or torque limit based on the switching frequency, available current, and/or other operating conditions. The torque capability may indicate the maximum torque that can be output by motor 150. The torque capability may be sent to vehicle control module 120 for converting an acceleration pedal depression operation into a torque command, as described above. For example, vehicle control module 120 may adjust or update a mapping relationship between acceleration pedal depression operations and output torque values. When vehicle control module 120 receives an increased torque capability, vehicle control module 120 may also increase the output torque value corresponding to a particular acceleration pedal depression operation.

As described above, the torque capability may be controlled or determined by torque capability controller 220. For example, when the enhanced mode is selected, torque capability controller 220 may reduce the switching frequency, determine an increased torque capability, and send the increased torque capability to vehicle control module 120. In another example, torque capability controller may determine a first torque value when the normal mode is selected and determine a second torque value when the enhanced mode is selected. Both the first and second torque values may be performance values of electric motor 150 that indicate the torque output capabilities or limits of motor 150 under different operation or driving conditions. For example, the first torque value may correspond to the torque output limit of motor 150 when a first switching frequency is applied to the inverter for driving motor 150. Similarly, the second torque value may correspond to the output limit of motor 150 when a second switching frequency is applied to the inverter for driving motor 150. The first torque value (e.g., corresponding to the normal mode) may be lower than the second torque value (e.g., corresponding to the enhanced mode). This can be achieved by applying a lower switching frequency to the inverter (e.g., the second switching frequency is lower than the first switching frequency).

While reducing the switching frequency may reduce the switching loss and permit a higher current, the switching frequency should be maintained above a certain threshold to ensure controllability of phase currents of motor 150. In general, the switching frequency should be at least 10 times of the fundamental frequency of the AC current. The ratio between the switching frequency and the fundamental frequency may also be referred to as a pulse ratio. During initial acceleration, because the rotation speed of motor 150 is relatively low, the fundamental frequency is also relatively low. Therefore, it is relatively easy to maintain the pulse ratio to be at least 10. As the speed of motor 150 increases, the fundamental frequency also increases, and it may become more difficult to maintain the proper pulse ratio. Therefore, torque capability controller 220 may increase the switching frequency to a regular operation level when the speed of motor 150 reaches a particular value. Torque capability controller 220 may receive feedback from control loop 250 such as the rotor speed, stator current, or other information for determining a proper switching frequency value.

Reducing the switching frequency may also increase acoustic noise. Therefore, even the switching frequency satisfies the pulse ratio requirement, driving comfort may also account for the proper choice of the lower limit of the switching frequency. In addition, switching frequency may also relate to the control bandwidth of the current regulator of control loop 250. Torque capability controller 220 may be configured to control the switching frequency based on one or more of the above-described considerations.

The increase of the current may also be limited to a certain level. For example, to protect the power electronic devices, the maximum junction temperature of the power electronic devices should be controlled to acceptable levels. Voltage stresses on the power electronic devices due to switching transients should also be considered.

The increased current may also increase the DC current output of energy storage device 130. In general, however, during initial acceleration the overall power level is not maximum (power is proportional to torque times speed), there should be enough margins left for energy storage device 130 to provide the required DC current.

Figure 3A:
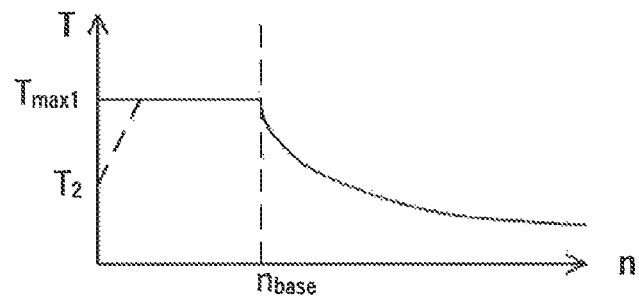
FIGS. 3A-3E show initial acceleration performance curves of an exemplary vehicle in a normal mode.
Figure 3B:
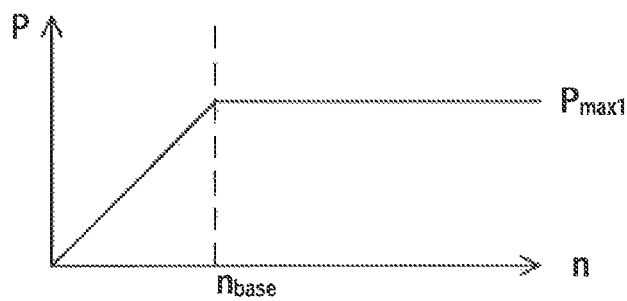
Figure 3C:
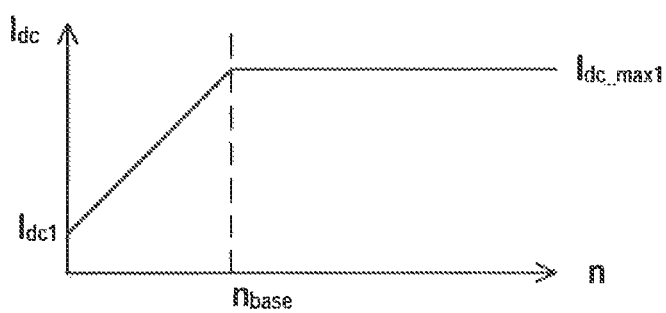
Figure 3D:
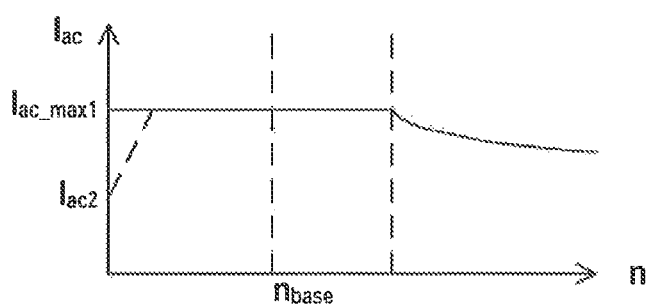
Figure 3E:
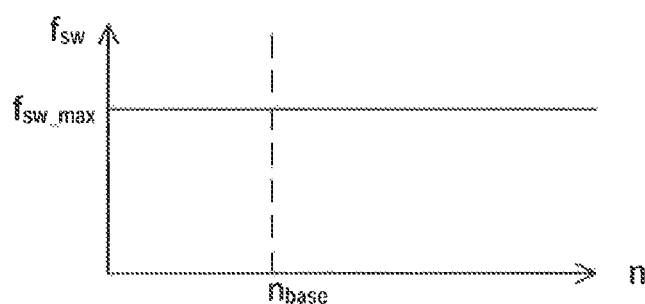

FIGS. 3A-3E show initial acceleration performance curves of vehicle 100 in a normal mode. In the normal mode, torque capability controller 220 may not reduce the switching frequency. Rather, the switching frequency $f_{sw}$ may be kept constant as its maximum level $f_{sw\_max}$, as shown in FIG. 3E. During initial acceleration, the speed of motor 150 increases from zero to its base speed $n_{base}$, where the output power of motor 150 (P) reaches the maximum value $P_{max1}$, as shown in FIG. 3B. Similarly, the DC current provided by energy storage device 130 also increases from an initial value $I_{dc1}$ (at zero speed) to its maximum value $I_{dc\_max1}$ (at $n_{base}$), as shown in FIG. 3C. FIG. 3A shows a torque curve (T), which includes two scenarios. The first scenario (indicated by the solid line) is when the user depresses pedal 125 hard and abruptly, resulting in the maximum torque output $T_{max1}$ from the very beginning of the acceleration process. The second scenario (indicated by the dashed line) is when the user depresses pedal 125 relatively slowly and gently, resulting in a slope of torque output rising from the initial value $T_2$ to the maximum value $T_{max1}$. FIG. 3D shows a stator current curve $I_{ac}$, which is similar to the torque curve. In the first scenario $I_{ac}$ reaches its maximum value $I_{ac\_max1}$ at the beginning of the acceleration process. In the second scenario $I_{ac}$ starts from a smaller value $I_{ac2}$ and gradually rises to the maximum value $I_{ac\_max1}$.

FIGS. 4A-4E show initial acceleration performance curves of vehicle 100 in an enhanced mode. In the enhanced mode, torque capability controller 220 may reduce the switching frequency $f_{sw}$ to $f_{sw3}$ before the speed of motor 150 (n) reaches a first threshold speed $n_1$, as shown in FIG.

Figure 4A:
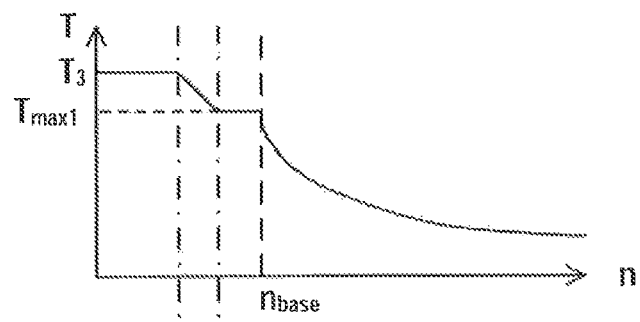
FIGS. 4A-4E show initial acceleration performance curves of an exemplary vehicle in an enhanced mode.
Figure 4B:
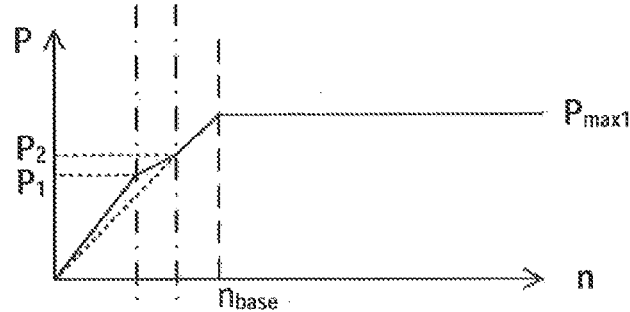
Figure 4C:
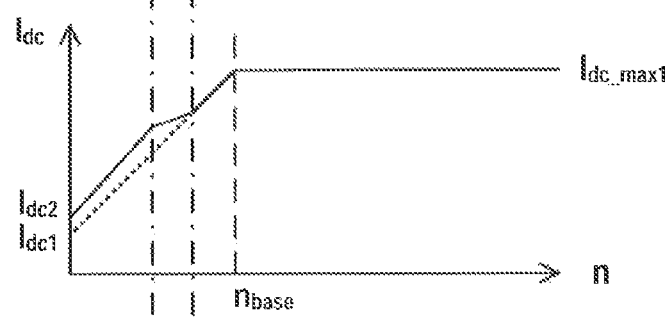
Figure 4D:
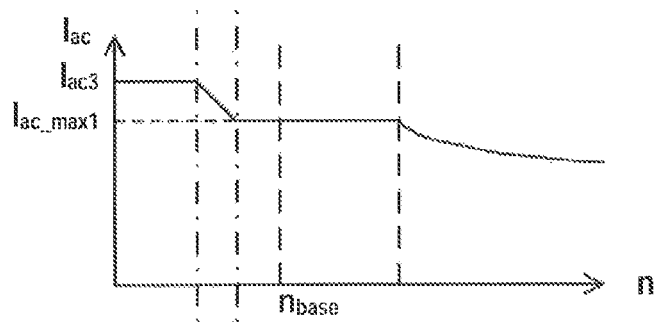
Figure 4E:
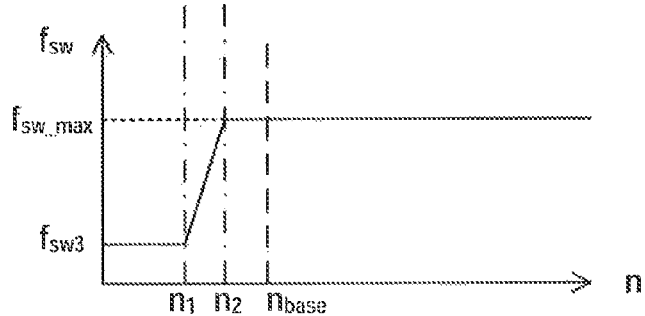

4E. As described above, $f_{sw3}$ may be determined based on factors such as pulse ratio, acoustic noise, and control bandwidth. The first threshold speed $n_1$ may be determined based on, for example, the pulse ratio. During the initial period from zero speed to $n_1$, the output torque T may be increased to $T_3$, higher than $T_{max1}$, as shown in FIG. 4A. This can be achieved because the stator AC current $I_{ac}$ can be increased to $I_{ac3}$, higher than $I_{ac\_max1}$, as shown in FIG. 4D. The value of $I_{ac3}$ may be determined based on factors such as the current limit of the power electronic devices used in the PWM inverter and the total loss including a decreasing in switching loss and an increasing in conduction loss. Because the torque is increased, the output power P also increases faster than that in the normal mode (indicated by a dashed line) and reaches $P_1$ when the speed reaches $n_1$, as shown in FIG. 4B. After the motor speed exceeds $n_1$, the switching frequency $f_{sw}$ can be gradually increased to the maximum frequency $f_{sw\_max}$, at which point the motor speed reaches a second threshold $n_2$, as shown in FIG. 4E. The second threshold speed $n_2$ can be determined based on, for example, the pulse ratio. During the period the motor speed increases from $n_1$ to $n_2$, the output torque T and stator current $I_{ac}$ both return to their respective normal-mode maxima $T_{max1}$ and $T_{ac\_max1}$, as shown in FIGS. 4A and 4D. The power P rises from $P_1$ to $P_2$, as shown in FIG. 4B. Once the motor speed reaches $n_2$, the remaining process is the same as that in the normal mode. The DC current $I_{dc}$ provided by energy storage device 130 follows a similar profile as the power, with an increased initial value $I_{dc2}$ compared to $I_{dc1}$ in the normal mode. As described above, energy storage device 130 should have sufficient margin to provide the additional current because $I_{dc2}$ is still below the maximum value $I_{ac\_max1}$.

Figure 5:
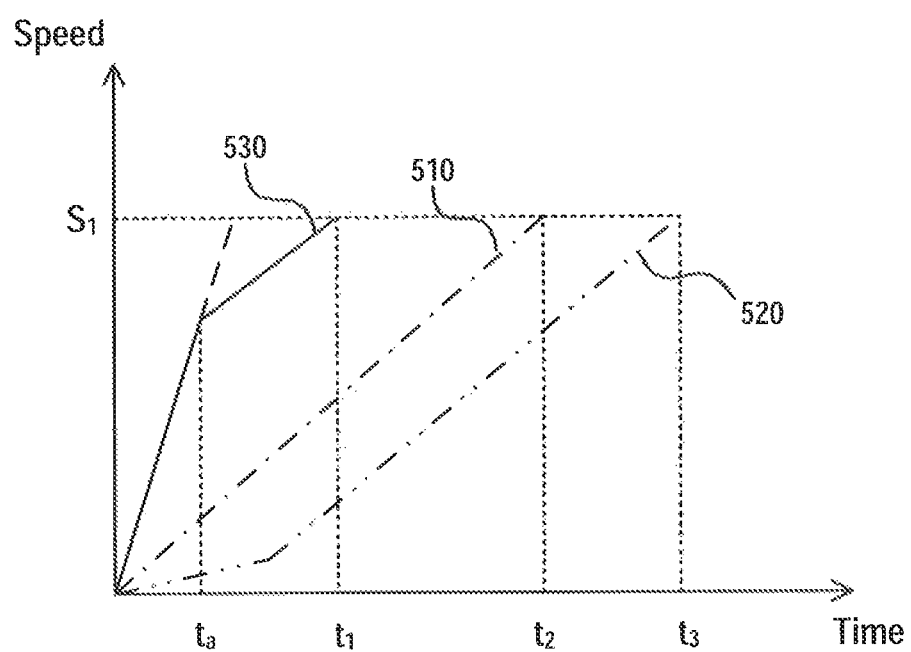
FIG. 5 shows acceleration profiles of an exemplary vehicle in different modes.

FIG. 5 shows initial acceleration profiles of vehicle 100 in different modes/scenarios. In FIG. 5, the horizontal axis represents time and the vertical axis represents vehicle speed. A benchmark speed $S_1$, for example, 60 mph, is used to evaluate the acceleration performances of vehicle 100. Curve 510 shows the acceleration profile in the first scenario of the normal mode, in which the user depresses pedal 125 hard and abruptly, corresponding to the solid torque line in FIG. 3A. As shown in FIG. 5, curve 510 shows that the speed of vehicle 100 increases almost linearly from zero to $S_1$. The time duration for reaching $S_1$ is $t_2$.

Curve 520 shows the acceleration profile in the second scenario of the normal mode, in which the user depresses pedal 125 relatively slowly and gently, corresponding to the torque profile in FIG. 3A starting from $T_2$ (the dashed line). Curve 520 shows that the initial acceleration (speed increase) is lower than curve 510. After the torque output reaches the same level as in the first scenario ($T_{max1}$ in FIG. 3A), the slope of the speed curve 520 becomes relatively parallel to curve 510. In the second scenario, because the initial acceleration is slower due to a lower torque, the time duration ($t_3$) for reaching $S_1$ is longer than $t_2$.

Curve 530 shows the acceleration profile of vehicle 100 in the enhanced mode. In the enhanced mode, because the initial torque output is increased, the acceleration (speed increase) is also increased, as shown by a steeper initial slope of curve 530 compared to curve 510. If during the initial acceleration to $S_1$, the first threshold motor speed $n_1$ is reached, for example at time $t_a$, then the torque output may be reduced to $T_{max1}$, as shown in FIG. 4A, and the speed curve 530 may become relatively parallel to curve 510, as shown by the solid line in FIG. 5. If, on the other hand, $n_1$ has not been reached when the vehicle speed reaches $S_1$, then the increased acceleration may be maintained, as shown by the dashed line portion of curve 530. In any case, the time duration for reaching $S_1$ can be reduced to $t_1$, shorter than $t_2$, thereby improving the acceleration performance of vehicle 100.

Figure 6:
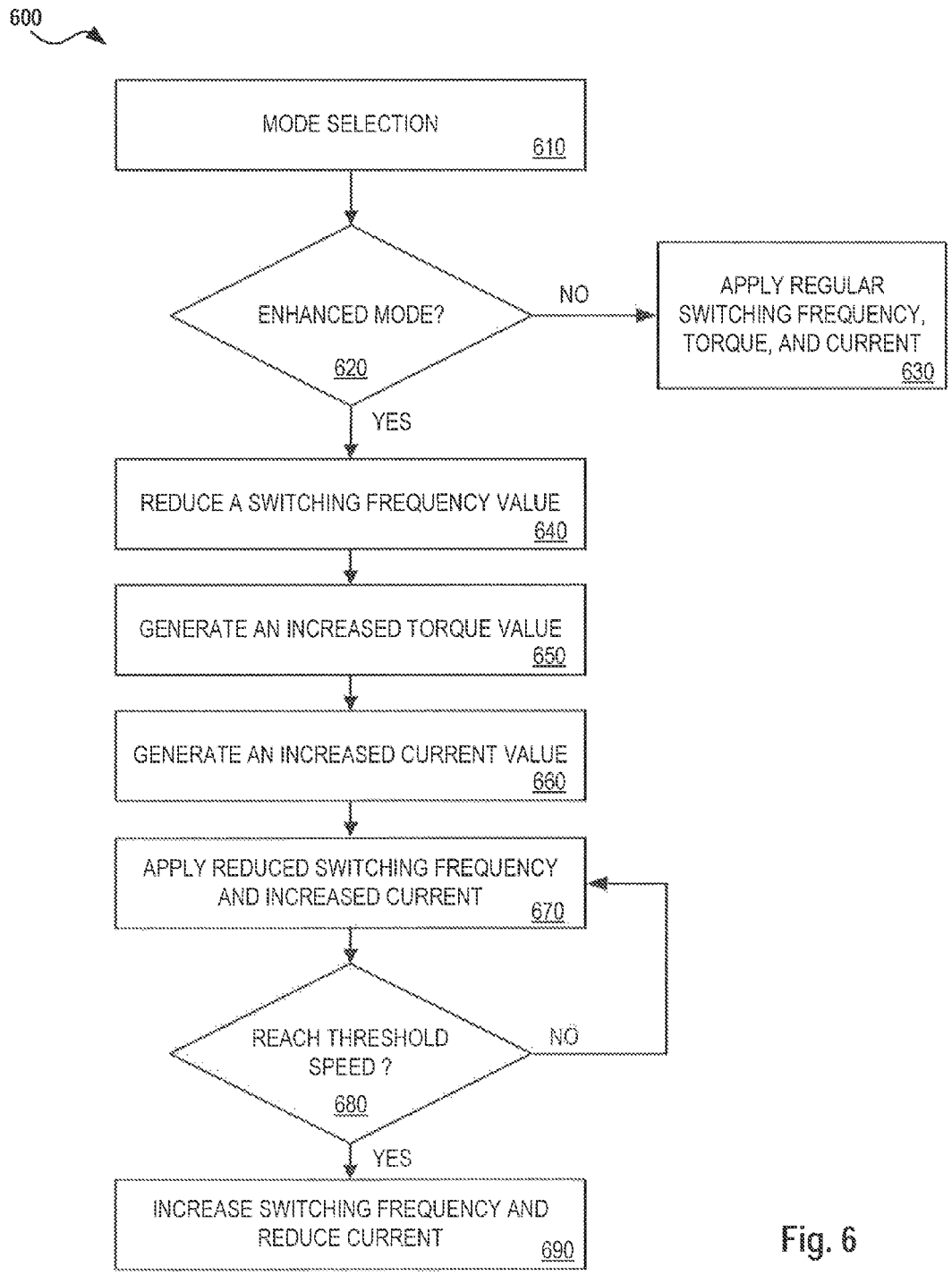
FIG. 6 is a flow chart illustrating an exemplary method of controlling an electric motor of a vehicle during initial acceleration.

FIG. 6 is a flowchart depicting a method 600 for controlling electric motor 150 of vehicle 100 during initial acceleration, according to an embodiment of this disclosure. Method 600 includes a plurality of steps, some of which may be optional. Method 600 may be carried out by a processor device executing an algorithm and/or instructions, by dedicated circuitries configured to perform one or more specific functions, or by a combination thereof.

In step 610, mode selector 210 may receive a selection of an acceleration mode from a user. Available acceleration modes may include a normal mode and one or more enhanced modes.

In step 620, the mode selection information may be received by vehicle control module 120 and torque capability controller 220. If the selected mode is the normal mode, method 600 may proceed to step 630, in which a regular switching frequency (e.g., the maximum switching frequency $f_{sw\_max}$), a regular torque (e.g., $T_{max1}$ or $T_2$), and a regular current (e.g., $I_{ac\_max1}$ or $I_{ac2}$) may be applied to control motor 150.

If the selected mode is an enhanced mode, method 600 may proceed to step 640. In step 640, torque capability controller 220 may reduce the value of the switching frequency from the normal value to a lower value to reduce the switching loss. For example, torque capability controller 220 may use $f_{sw3}$ instead of $f_{sw\_max}$ during an initial acceleration period, as shown in FIG. 4. Torque capability controller 220 may determine a torque capability or torque limit based on the reduced switching frequency and send the torque capability to vehicle control module 120.

In step 650, vehicle control module 120 may generate a torque command having an increased value (e.g., $T_3$) based on an acceleration pedal depression action and the received torque capability. The increased torque value may improve the acceleration performance of vehicle 100. For example, the increased torque may reduce the 0-60 mph acceleration time by 0.5-1.2 seconds compared to the acceleration time in the normal mode.

In step 660, torque linearization module 230 may generate a stator current value is having an increased value (e.g., $I_{ac3}$) to achieve the increased torque value generated by vehicle control module 120. While the increased current results in an increase in the conduction loss, the total loss may be kept within limit due to the cancelling effect of the reduced switching loss and the increased conduction loss.

In step 670, the increased current value and the reduced switching frequency value may be applied by control loop 250 to control motor 150. Control loop 250 may include speed monitoring device to monitor the rotational speed of motor 150. In step 680, the rotational speed may be compared to a threshold speed (e.g., $n_1$). If the motor speed does not reach the threshold speed, then method 600 returns back to step 670 to continue controlling motor 150 using the reduced switching frequency and the increased current. If the motor speed reaches the threshold speed, then method 600 proceeds to step 690 to increase the switching frequency (e.g., from $f_{sw3}$ to $f_{sw\_max}$) and to reduce the current (e.g., from $I_{ac3}$ to $I_{ac\_max1}$). After a period of time (e.g., when the motor speed reaches $n_2$), the switching frequency and the current may return to their respective values in the normal mode, and motor control may continue in the same manner as the normal mode.

The embodiments disclosed above include systems and methods for improving acceleration performance of an electric vehicle. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed embodiments are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be used in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples of computer-readable media include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system for controlling an electric motor, comprising:
   an inverter configured to drive the electric motor, the inverter including at least one power electronic device; and
   a torque capability controller configured to:
      receive information indicative of a selection by a user between a first mode and a second mode, the second mode corresponding to a higher torque to be output by the electric motor than the first mode; and
      apply a switching frequency to the at least one power electronic device, the switching frequency having a lower value when the received information indicates the selection of the second mode than when the received information indicates the selection of the first mode.

2. The system of claim 1, wherein when the received information indicates the selection of the second mode, the torque capability controller is configured to:
   maintain the switching frequency applied to the at least one power electronic device before a rotational speed of the electric motor reaches a threshold speed; and
   increase the switching frequency when the rotational speed of the electric motor exceeds the threshold speed.

3. The system of claim 2, wherein the threshold speed is determined based on a pulse ratio indicating a ratio between the switching frequency and a fundamental frequency of the electric motor.

4. The system of claim 1, further comprising a mode selector configured to provide the information indicative of the selection between the first mode and the second mode.

5. The system of claim 4, further comprising a vehicle controller configured to:
   receive the information indicative of the selection between the first mode and the second mode from the mode selector; and
   generate a torque command indicating a torque to be output by the electric motor based on the received information,
   wherein the torque indicated by the torque command is higher when the received information indicates that the second mode is selected than when the received information indicates that the first mode is selected.

6. The system of claim 5, further comprising a torque-current convertor configured to:
   receive the torque command from the vehicle controller;
   receive information of the switching frequency from the torque capability controller; and
   generate a current value based on the torque command and the information of the switching frequency.

7. The system of claim 6, wherein the current value is higher when the second mode is selected than when the first mode is selected.

8. The system of claim 6, wherein the current value is determined based on a current limit of the at least one power electronic device.

9. A method for controlling an electric motor, comprising:
   driving the electric motor using an inverter, the inverter including at least one power electronic device;
   receiving information indicative of a selection by a user between a first mode and a second mode, the second mode corresponding to a higher torque to be output by the electric motor than the first mode; and
   applying a switching frequency to the at least one power electronic device, the switching frequency having a lower value when the received information indicates the selection of the second mode than when the received information indicates the selection of the first mode.

10. The method of claim 9, further comprising:
    when the received information indicates the selection of the second mode, maintaining the switching frequency applied to the at least one power electronic device before a rotational speed of the electric motor reaches a threshold speed; and
    increasing the switching frequency when the rotational speed of the electric motor exceeds the threshold speed.

11. The method of claim 10, wherein the threshold speed is determined based on a pulse ratio indicating a ratio between the switching frequency and a fundamental frequency of the electric motor.

12. The method of claim 9, further comprising:
providing, by a mode selector, the information indicative of the selection between the first mode and the second mode.

13. The method of claim 12, further comprising:
receiving, from the mode selector, the information indicative of the selection between the first mode and the second mode; and
generating a torque command indicating a torque to be output by the electric motor based on the received information,
wherein the torque indicated by the torque command is higher when the received information indicates that the second mode is selected than when the received information indicates that the first mode is selected.

14. The method of claim 13, further comprising:
receiving, by a torque-current converter, the torque command;
receive, by the torque-current converter, information of the switching frequency from the torque capability controller; and
generating, by the torque-current converter, a current value based on the torque command and the information of the switching frequency.

15. The method of claim 14, wherein the current value is higher when the second mode is selected than when the first mode is selected.

16. The method of claim 14, wherein the current value is determined based on a current limit of the at least one power electronic device.

17. A method for controlling an electric motor, comprising:
driving the electric motor using an inverter, the inverter including at least one power electronic device operating according to a switching frequency;
receiving information indicative of a selection by a user between a first mode and a second mode, the first mode corresponding to a first performance value of the electric motor and the second mode corresponding to a second performance value of the electric motor; and
adjusting the switching frequency applied to the at least one power electronic device according to the received information, the switching frequency having a first frequency value when the received information indicates the selection of the first mode and a second frequency value when the received information indicates the selection of the second mode.

18. The method of claim 17, wherein the second performance value is greater than the first performance value, and the second frequency value is lower than the first frequency value.

19. The method of claim 18, wherein the first performance value is a first torque value output by the electric motor, and the second performance value is a second torque output by the electric motor.

20. The method of claim 17, wherein when the received information indicates the selection of the second mode, the method further comprising:
maintaining the switching frequency applied to the at least one power electronic device before a rotational speed of the electric motor reaches a threshold speed; and
increasing the switching frequency when the rotational speed of the electric motor exceeds the threshold speed.

* * * * *